US012698753B2

(12) United States Patent
Harms et al.

(10) Patent No.: US 12,698,753 B2
(45) Date of Patent: Aug. 4, 2026

(54) METHOD FOR YAW CONTROL OF A WIND TURBINE AND A WIND TURBINE HAVING A YAW CONTROL

(71) Applicant: Nordex Energy SE & Co. KG, Hamburg (DE)

(72) Inventors: Ulrich Harms, Hamburg (DE); Jan Gellermann, Dinslaken (DE); Pablo Gil, Sarriguren (ES); Jörg Schwarte, Rostock (DE); Steffen Meier, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 19/242,811

(22) Filed: Jun. 18, 2025

(65) Prior Publication Data

US 2025/0314236 A1 Oct. 9, 2025

Related U.S. Application Data

(63) Continuation of application No. PCT/EP2023/085091, filed on Dec. 11, 2023.

(30) Foreign Application Priority Data

Dec. 19, 2022 (EP) .................................... 22214554

(51) Int. Cl.
*F03D 7/02* (2006.01)

(52) U.S. Cl.
CPC ......... *F03D 7/0264* (2013.01); *F03D 7/0204* (2013.01); *F05B 2270/32* (2013.01); *F05B 2270/321* (2013.01); *F05B 2270/337* (2013.01)

(58) Field of Classification Search
CPC ........ F03D 7/0264; F03D 7/0204; F03D 1/81; F03D 17/029; F05B 2270/32;
(Continued)

(56) References Cited

U.S. PATENT DOCUMENTS

| | | | |
|---|---|---|---|
| 8,188,610 B2 | 5/2012 | Scholte-Wassink | |
| 8,987,930 B2 | 3/2015 | Matzen | |

(Continued)

FOREIGN PATENT DOCUMENTS

| | | | |
|---|---|---|---|
| CN | 107587977 A | 1/2018 | |
| EP | 2 483 555 B1 | 1/2016 | |

(Continued)

OTHER PUBLICATIONS

International Search Report of the European Patent Office dated Feb. 27, 2024 for international application PCT/EP2023/085091 on which this application is based.

(Continued)

*Primary Examiner* — Nathaniel E Wiehe
*Assistant Examiner* — Maxime M Adjagbe
(74) *Attorney, Agent, or Firm* — Walter Ottesen, P.A.

(57) ABSTRACT

A method is for yaw control of a wind turbine. The wind turbine includes a wind turbine controller, a regular power supply to supply the wind turbine with electric power in case of a normal mode of operation, and a power backup system to supply the wind turbine with electric power in case of a grid outage. The method includes: detecting a grid outage for the wind turbine, switching from the regular power supply to the power backup system in case of the detected grid outage, and switching the wind turbine from the normal mode of operation to a less-active mode of operation in which the electric power consumption of the wind turbine is reduced compared to the normal mode of operation.

17 Claims, 4 Drawing Sheets

(58) Field of Classification Search
CPC .......... F05B 2270/321; F05B 2270/107; F05B 2260/845
See application file for complete search history.

(56) References Cited

U.S. PATENT DOCUMENTS

| | | | | |
|---|---|---|---|---|
| 9,677,540 | B2 | 6/2017 | Burra et al. | |
| 2014/0145439 | A1* | 5/2014 | Burra ................... | F03D 7/0204 |
| | | | | 290/44 |
| 2019/0219033 | A1* | 7/2019 | Caponetti ............. | F03D 7/0204 |
| 2019/0285058 | A1* | 9/2019 | Hoffmann ............. | F03D 17/029 |
| 2022/0349382 | A1* | 11/2022 | Palomares Rentero ..................... | |
| | | | | H02K 7/1838 |

FOREIGN PATENT DOCUMENTS

| | | | |
|---|---|---|---|
| EP | 3 128 170 | B1 | 2/2018 |
| EP | 3 462 017 | A1 | 4/2019 |
| EP | 3 712 427 | A1 | 9/2020 |

OTHER PUBLICATIONS

Written Opinion of the International Searching Authority dated Feb. 27, 2024 for international application PCT/EP2023/085091 on which this application is based.
International Preliminary Report on Patentability of the International Bureau of WIPO dated Jun. 24, 2025 for international application PCT/EP2023/085091 on which this application is based.

* cited by examiner

METHOD FOR YAW CONTROL OF A WIND TURBINE AND A WIND TURBINE HAVING A YAW CONTROL

CROSS-REFERENCE TO RELATED APPLICATIONS

This application is a continuation application of international patent application PCT/EP2023/085091, filed Dec. 11, 2023, designating the United States and claiming priority from European application 22214554.2, filed Dec. 19, 2022, and the entire content of both applications is incorporated herein by reference.

TECHNICAL FIELD

The present application pertains to a method for yaw control of a wind turbine and to a wind turbine. The wind turbine is provided with a wind turbine controller and a power backup system to supply electrical devices of the wind turbine with electric power in case of a grid outage.

BACKGROUND

The wind turbine shall remain aligned with the wind direction during a grid outage when at the same time a severe storm occurs. This wind direction alignment is necessary to keep loads on the wind turbine in an acceptable range. Otherwise, the wind turbine would have to be configured for higher wind speeds which results in more material needed for parts like blades and tower.

In prior art there is a yaw power backup (YPB) known to control a yaw system of a wind turbine above standard cut-out wind speeds. The YPB ensures that the nacelle and blade assembly can continue to yaw accurately in wind speeds of up to 70 m/s. The YPB can be supplemented with an external diesel generator allowing the yaw system to operate independently even if the grid fails in case of a power shortage. In general, the yaw system may include a yaw drive, a yaw brake, a yaw controller, a yaw converter, a yaw brake disk, a yaw bearing and other components for yawing the nacelle. The specific configuration of the yaw system may vary with the used technology to drive the yaw system and to brake the yaw system.

EP 2 483 555 B2 describes a method of controlling a wind turbine during a stand-still in a non-power producing situation of the wind turbine. The position of the nacelle is continuously or periodically actuated via the yaw drive system. By actuating the yaw drive system, the nacelle varies its alignment to the wind direction, even at high wind speeds.

EP 3 128 170 B1 describes an emergency operation control device for a wind turbine which commands the yaw brakes and the yaw drives in an emergency operation. The emergency operation of the yaw drives effects turning of the nacelle into a position in which a longitudinal axis of the nacelle is crosswise to the wind direction.

From EP 3 462 017 A1 a yaw system for a wind turbine is known, having a contingency autonomous yaw control capability. The yaw system of the wind turbine has an auxiliary power supply with a brake power control device. A controller is configured to implement a protective control strategy for the yaw system in response to a failure. The protective control strategy includes controlling the remaining yaw system components via one or more distributed I/O modules communicatively coupled to the controller. Furthermore, the auxiliary power supply is switched to the brake power control device.

EP 3 712 427 A1 describes a wind turbine including an active yaw system realized to maintain an upwind orientation of the wind turbine aerodynamic rotor. The yaw system includes a power supply which is activated during normal operation and a dedicated negative brake reserve power supply configured to supply power to the negative brakes in the event of a grid disconnection.

U.S. Pat. No. 9,677,540 B2 discloses a yaw backup system for a wind farm. The yaw control receives a signal for a wind direction over time from a sensor and alters a tolerance level of a wind turbine based on changes in the signal for the wind direction over time. The yaw control also controls delivery of power to the yaw drive system from the auxiliary power of the energy storage medium based on a tolerance level for the control of the yaw angle for reducing a load on the wind turbine induced by wind.

SUMMARY

It is an object of the present disclosure to provide a control method for a wind turbine and a wind turbine which allow to operate a yaw system during events of grid outage.

The aforementioned object is, for example, solved by various embodiments of the disclosure.

According to the disclosure a yaw system for the wind turbine is controlled by a wind turbine controller. The wind turbine controller may include a yaw controller. The wind turbine furthermore includes a regular power supply to supply electric power to the wind turbine in case of a normal mode of operation of the wind turbine and a power backup system to supply electric power to the wind turbine in case of a grid outage. The grid outage refers to any situation in which the grid does not provide sufficient power for the wind turbine to operate and in particular to supply its yaw system with electric power. The method of the disclosure starts by detecting the grid outage for the wind turbine. In a following step the power supply is switched from the regular power supply to the power backup system in case of a detected grid outage. Finally, the wind turbine is switched to a less-active mode of operation in which the power consumption of the wind turbine is reduced compared to a normal mode of operation. The control method is based on the idea, that in case of a grid outage the power backup system for the wind turbine can be used. However, in order to minimize the power consumption during the grid outage event, the wind turbine controller switches the wind turbine to a second mode of operation, a less-active mode of operation, in which the power consumption of the wind turbine is reduced. The power consumption of the wind turbine is covered by an internal power production and/or by power taken from the grid, if possible. The less-active mode of operation may include a plurality of different kinds of steps and operation modes. In particular the less-active operation mode is important for the wind turbine in case the actual wind speed is above a cut-out wind speed. In the normal mode of operation an averaging time of at least one relevant signal for a yaw control is relatively small compared to a less-active mode of operation of yaw control. For example, the averaging time can be reduced from 1 min or 2 min to an average of 8 min to 10 min. In the same way an allowed misalignment of the nacelle with respect to the wind direction may be bigger than in the normal mode of operation. For example, the allowed misalignment may be increased up to +/−7 degrees or more in the less-active mode of operation while in normal mode of operation the allowed misalignment may be 1 to 2 degrees or less. Preferable, the yaw controller works with the same frequency in both modes of operation.

In an embodiment the less-active mode of operation includes increasing an averaging time of at least one relevant signal for the yaw control, wherein the increase takes place compared to an averaging time during normal mode of operation. Additionally, or in alternative it is also possible to increase an allowed misalignment of the nacelle with respect to the wind direction in the less-active mode of operation. The increase in the less-active mode of operation is again compared to the normal mode of operation. Usually, the yaw control of a wind turbine aims to align the nacelle with the wind direction. Of course, this is done based on a time average of relevant signals. These relevant signals may include a wind direction, a wind speed, and a turbulence intensity at a specific point of time or at a period of time. Instead of controlling the yaw position based on a short time average, the time period for the averaging may be increased so that the yaw control does not follow every small change in the relevant parameter. A similar result is achieved by increasing the allowed misalignment of the nacelle with respect to the wind direction. In the normal mode of operation, a misalignment within a predetermined normal yaw sector is accepted without initiating a yawing movement. In the less-active mode, this yaw sector is increased therefore, reducing the number of yaw movements if the wind direction has changed.

The less-active mode of operation may also include steps like shutting down or reducing activities of the pitch system. Furthermore, heaters and anti-icing systems, for example, for the rotor blades or the nacelle may be shut down or their power consumption may be reduced. In the less-active mode of operation in which the wind turbine is supplied with electrical energy by the power backup system any unnecessary power consumption is avoided. Power consumers necessary for a restart of the wind turbine are not switched off, preferably these power consumers are switched to a stand-by mode with a reduced power consumption.

In an embodiment of the inventive method at least one yaw brake is applied after each yaw movement in the less active mode of operation. Applied yaw brakes contribute to reduce the energy consumption of the yaw drives from the power backup system in the less-active mode of operation. In a preferred embodiment the input signals for the yaw brake control include signals such as wind direction, wind speed, and turbulence intensity. All of these signals are either measured, calculated or estimated, and can be used for the yaw control. Furthermore, in a preferred embodiment, a threshold value for a wind speed is defined. If the value of the wind speed corresponds to the threshold value for the wind speed or is above the threshold value for the wind speed, the allowed misalignment of the nacelle with respect to the wind direction is not increased in the less-active mode of operation.

In an embodiment an averaging time of the at least one relevant signal for the yaw control is increased to one minute or more, in particular to three minutes or more, for example an average yaw alignment, an average wind direction, an average torque value of the yaw drives. That is, in the normal mode of operation the yaw control for example uses a shorter period of time for averaging the wind direction than in the less-active mode of operation. In the less-active mode of operation, the period of time for averaging is increased to one minute or longer, even up to 8 min. or more is possible.

Preferably, the average values for the signals are moving average values taken over a period of time for a predetermined subset of values.

When the allowed misalignment of the nacelle with respect to the wind direction is increased, a misalignment of +/−5° is permitted. In particular the allowed misalignment can be increased up to +/−7° or even more. Increasing the allowed misalignment of the nacelle with respect to the wind direction, the number and frequencies of yaw movements in order to align the nacelle with the current wind direction is significantly reduced. In a preferred embodiment, the allowed misalignment depends on the wind speed. The dependency is such that with increasing wind speed the allowed misalignment is reduced. This means, the higher the wind speed, less misalignment of the nacelle is tolerated.

In an embodiment of the disclosure, the less-active mode of operation for the wind turbine still includes control functions, for example, a monitoring of the yaw control and of the turbine control. That is, even if some of the control functions of the wind turbine may be switched off in order to operate in a less-active mode of operation, preferably the monitoring of the yaw control and of the turbine control is still active and not switched off.

According to an embodiment the less-active mode of operation for the wind turbine may include to continue operation of one or more of the following control functions: wind speed measuring, wind direction measuring, heating of the weather mast and/or operating the wind turbine controller including communication and safety systems for basic turbine functions such as heating cabinets which contain necessary components for yawing and require a minimum temperature. Each of the control functions may be active as part of the less-active mode of operation.

In an embodiment the grid outage is detected by measuring a grid voltage and comparing the measured value of the grid voltage to a predetermined value for the grid voltage. Measurement and comparison of the grid voltage can be done for one or more phases of a three-phase electric power. The comparison is carried out for a predetermined time period of more than 30 seconds, preferable more than 60 seconds. The wind turbine may use different or more complex definitions for critical situations of the wind turbine. For the purpose of yaw control, it is sufficient if the measured value of the grid voltage differs from a predetermined value for the grid voltage for a predetermined period of time. Of course, it can be specified that the compared values of the grid voltage must differ by a predetermined amount in order to define a grid outage. For example, the difference of the measured value of the grid voltage and the predetermined value for the grid voltage needs to be larger than 5%, or 10% for more than 30 seconds.

In an embodiment the pitch system turns at least one rotor blade into a feathered position by using pitch batteries before the power backup system is switched on. By turning the rotor blades using the pitch batteries, energy in the power backup system is saved.

The underlying technical problem of the disclosure is also solved by a wind turbine according to the disclosure. The wind turbine includes a wind turbine controller, a regular power supply to supply electric power to the wind turbine in case of a normal mode of operation of the wind turbine and a power backup system to supply electric power to the wind turbine in case of the grid outage. The wind turbine controller is adapted to detect the grid outage for the wind turbine, to switch from the regular power supply to the power backup system in case of the detected grid outage and to switch the wind turbine into a less-active mode of operation in which the power consumption of the wind turbine is reduced compared to a normal mode of operation. The wind turbine according to the disclosure is therefore suited even in the case of the grid outage to resist high wind speeds, even wind speeds greater than cut-off wind speeds. By switching to a less-active mode of operation the energy consumption of the wind turbine is reduced and it is possible to reduce the capacity of the power backup system or to run the wind turbine for longer time in the less-active mode of operation.

In an embodiment it is possible to increase an average time of at least one relevant signal for the yaw control. This relevant signal may be chosen from wind direction, wind speed, turbulence intensity, and any combination thereof. A second feature of the less-active mode of operation is to allow an increased allowed misalignment of the nacelle with respect to the wind direction. Of course, it is possible to combine both aspects in the less-active mode of operation.

In an embodiment the yaw system includes at least one yaw brake. The yaw control is adapted to apply the yaw brake after each yaw movement. In this embodiment the applied yaw brake is only released if the nacelle has to be aligned with the wind direction, that is, the orientation of the yaw system has to be adapted and the yaw drives are operated.

In an embodiment the power backup system includes at least one or more batteries as energy devices for the power supply. Of course, it is in principle also possible to use one or more diesel generators as energy devices for the power backup system. Not only for batteries but also for diesel generators and any other energy device, the question remains how to dimension the power supply in the right way. By using the less-active operation mode of operation, no matter which energy devices are used, the power backup system can be downsized.

BRIEF DESCRIPTION OF DRAWINGS

The invention will now be described with reference to the drawings wherein.

DETAILED DESCRIPTION

Figure 1:
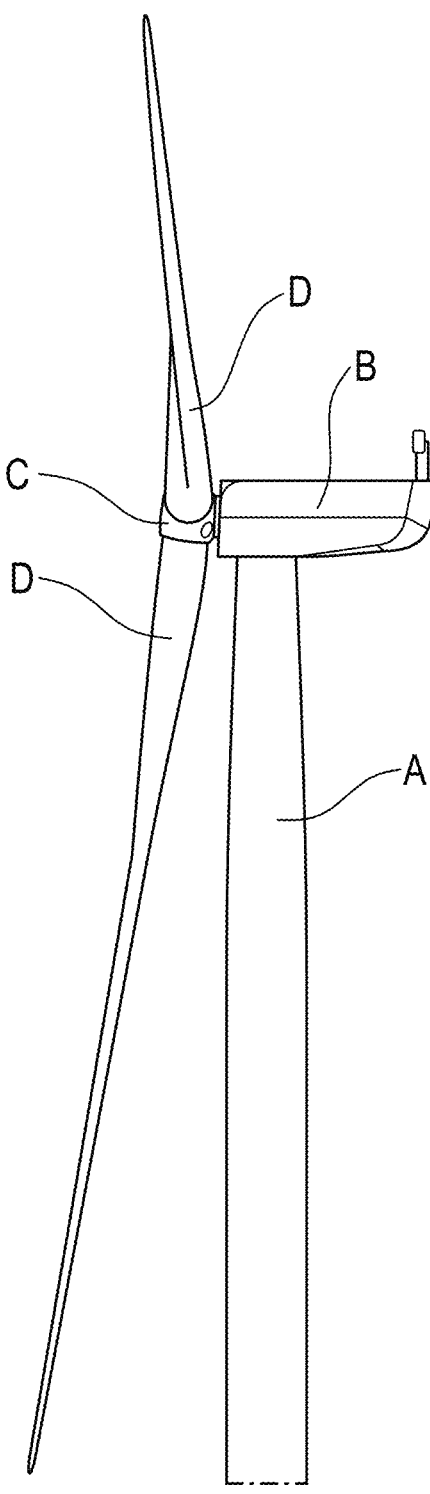
FIG. 1 shows a wind turbine in a schematic view.

FIG. 1 shows in a schematic view of a wind turbine having a tower A which bears a nacelle B. The nacelle B is rotatably mounted to a tower head and supports a drive train (not shown). The drive train bears a rotor hub C to which three rotor blades D are connected. The wind turbine uses a yaw system and a yaw control to align the nacelle B with the wind direction.

Figure 2:
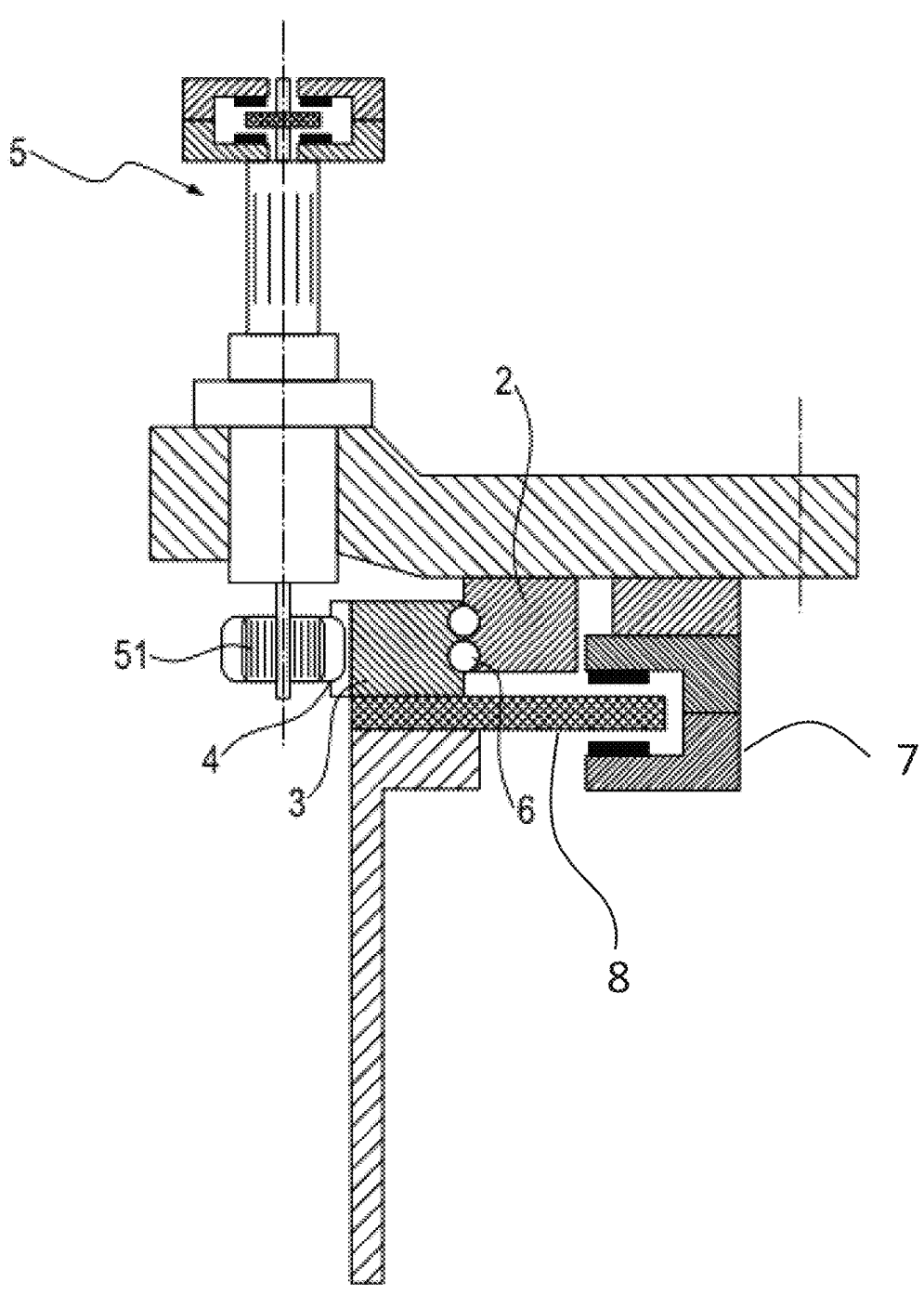
FIG. 2 shows a schematic view of a yaw system including yaw drives and yaw brakes.

FIG. 2 shows in a schematic view a cross section of the yaw system. The yaw system includes a yaw drive 5 which has a gear pinion 51. The gear pinion 51 engages into a toothing 4 of an outer bearing ring of the yaw bearing. The inner bearing ring 2 of the yaw bearing is mounted to a base plate of the nacelle which also bears the yaw drive 5. As shown in FIG. 2 inner and outer yaw bearing rings include two bearing runs 6. Additionally, a yaw brake 7 is shown which interacts with a yaw brake disk 8. The yaw brake disk

8 is mounted to the tower of the wind turbine while the yaw brake is mounted to the base plate of the nacelle.

Figure 3:
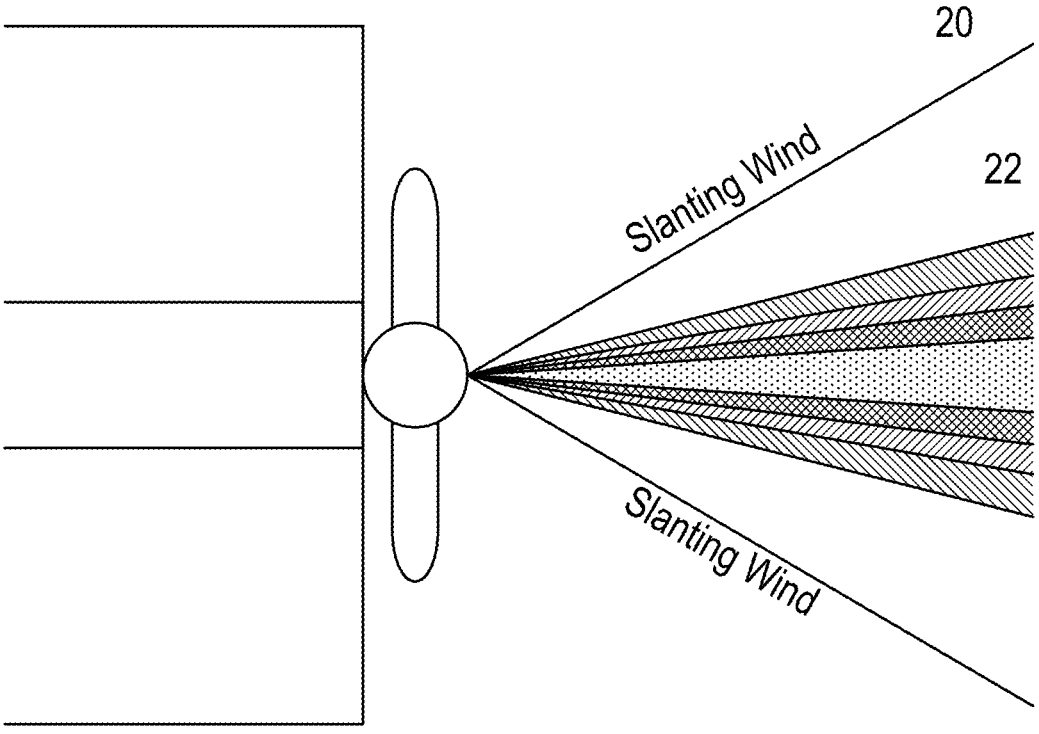
FIG. 3 shows different areas of misalignment for the nacelle of the wind turbine; and, FIG. 4 shows the control of the yaw brakes and the yaw drives in a less-active mode of operation.

FIG. 3 shows the nacelle, the hub and the rotor blades in a schematic view from the top. An area of allowed misalignment 20 is shown in front of the rotor hub. The area of allowed misalignment is symmetric to the longitudinal axis of the nacelle. The yaw control does not correct the orientation of the nacelle with respect to the wind direction in the less-active mode of operation if the orientation of the nacelle falls within the area of allowed misalignment 20. It is possible that the area of allowed misalignment is reduced to the area 22 if the wind speed increases. This means, the higher the wind speed gets the less misalignment of the nacelle is accepted.

Figure 4:
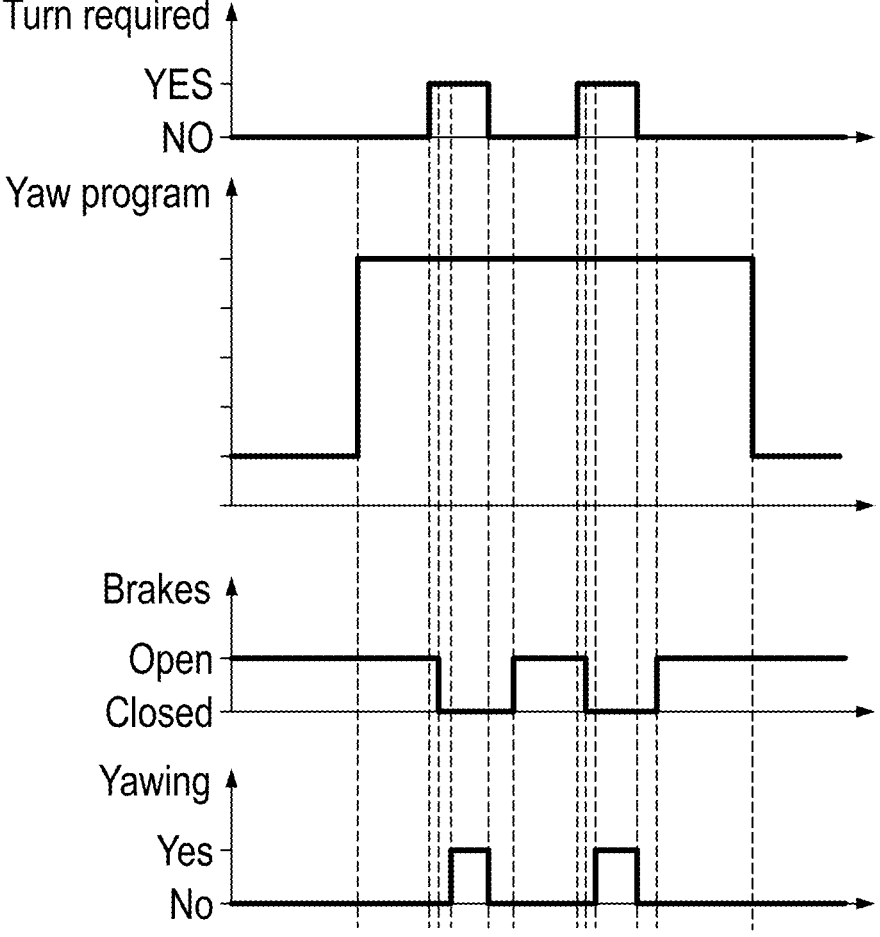

FIG. 4 shows the operation of the yaw control in the less-active mode of operation. As can be seen in the figure, a yaw program starts at a certain point in time for a certain period of time. The yaw brakes are applied, that is, the yaw brakes are closed to build up a braking torque, if no yaw adjustment is required. In situations in which yaw adjustment is required the yaw brakes are released, that is, the yaw brakes are opened and yawing takes place. After yawing has been finished and a yaw adjustment is no longer required the yaw brakes are applied again.

It is understood that the foregoing description is that of the preferred embodiments of the invention and that various changes and modifications may be made thereto without departing from the spirit and scope of the invention as defined in the appended claims.

The invention claimed is:

1. A method for yaw control of a wind turbine, the wind turbine including a wind turbine controller, a regular power supply to supply the wind turbine with electric power in case of a normal mode of operation, and a power backup system to supply the wind turbine with electric power in case of a grid outage, the method comprising:

detecting the grid outage for the wind turbine;

switching from the regular power supply to the power backup system in case of the detected grid outage; and, switching the wind turbine from the normal mode of operation to a less-active mode of operation in which electric power consumption of the wind turbine is reduced compared to the normal mode of operation, wherein the less-active mode of operation includes at least one of:

increasing an averaging time of at least one relevant signal for the yaw control, wherein the increase takes place compared to the averaging time during the normal mode of operation; and, increasing an allowed misalignment of the nacelle with respect to the wind direction, wherein the increase takes place compared to the allowed misalignment of the nacelle with respect to the wind direction during the normal mode of operation.

2. The method of claim 1, wherein the less-active mode of operation includes at least one of:

shutting down or reducing activities of a pitch system; and, shutting down or reducing temperatures of heaters and anti-icing systems.

3. The method of claim 1, wherein the less-active mode of operation includes applying at least one yaw brake after each yaw movement.

4. The method of claim 1, wherein a threshold value for wind speed is defined such that, in the less-active mode of operation an allowed misalignment of the nacelle with respect to wind direction is only increased if the value of the wind speed is below a threshold value.

5. The method of claim 1, wherein an averaging time of at least one signal is increased to 1 minute or more; and, wherein the at least one signal is chosen from an averaged yaw alignment, an averaged wind direction and an averaged torque value of yaw drives.

6. The method of claim 1, wherein an increased allowed misalignment of the nacelle with respect to wind direction is +/−5 degrees or more.

7. The method of claim 6, wherein the allowed misalignment of the nacelle with respect to the wind direction depends on wind speed, wherein with increasing wind speed the allowed misalignment is smaller.

8. The method of claim 1, wherein the less-active mode of operation includes at least one of: measuring wind speed, measuring wind direction, heating a weather-mast, operating the wind turbine controller including communication systems and safety systems for basic turbine functions.

9. The method of claim 1 wherein the grid outage is detected by measuring grid voltage and comparing the measured value of the grid voltage to a predetermined value of the grid voltage for a predetermined time period of more than 30 s.

10. The method of claim 1, wherein a pitch system adjusts at least one rotor blade to a feathering position by using pitch batteries before the power backup system is switched on.

11. The method of claim 10, wherein the pitch system is shut off after the power backup system is switched on.

12. A wind turbine comprising:
a wind turbine controller;
a regular power supply configured to supply the wind turbine with electric power in case of a normal mode of operation;
a power backup system configured to supply the wind turbine with electric power in case of a grid outage;

said wind turbine controller being configured to:
detect the grid outage for the wind turbine,
switch from the regular power supply to the power backup system in case of the detected grid outage, and
switch the wind turbine to a less-active mode of operation, in which electric power consumption of the wind turbine is reduced compared to the normal mode of operation, wherein said wind turbine controller is configured, in the less-active mode, to at least one of:
increase an averaging time of at least one relevant signal for a yaw control, wherein the increase takes place compared to the averaging time during the normal mode of operation; and,
allow an increased misalignment of the nacelle with respect to wind direction, wherein the increase takes place compared to the allowed misalignment of the nacelle with respect to the wind direction during the normal mode of operation.

13. The wind turbine of claim 12 further comprising a yaw system having at least one yaw brake and a yaw control, wherein said yaw control is configured to apply said at least one yaw brake after each yaw movement.

14. The wind turbine of claim 13, wherein an input signal for said yaw control includes at least one of a wind direction signal, a wind speed signal, and a turbulence intensity signal.

15. The wind turbine of claim 13, wherein the yaw control is configured to process signals with an increased average time of 1 minute or more.

16. The wind turbine of claim 13, wherein said yaw controller is configured to increase the allowed misalignment of the nacelle with respect to a wind direction of +/−5 degree or more.

17. The wind turbine of claim 12, wherein said power backup system includes at least one of a battery, a diesel generator, and an ultra-capacitor for a power supply.

* * * * *